United States Patent
Inoue et al.

(10) Patent No.: US 6,711,601 B2
(45) Date of Patent: Mar. 23, 2004

(54) LOGARITHMIC ARITHMETIC UNIT AVOIDING DIVISION AS FAR AS PREDETERMINED ARITHMETIC PRECISION IS GUARANTEED

(75) Inventors: Yoshitsugu Inoue, Hyogo (JP); Hiroyuki Kawai, Hyogo (JP); Junko Kobara, Hyogo (JP); Robert Streitenberger, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 588 days.

(21) Appl. No.: 09/775,513

(22) Filed: Feb. 5, 2001

(65) Prior Publication Data

US 2001/0044815 A1 Nov. 22, 2001

(30) Foreign Application Priority Data

Apr. 14, 2000 (JP) ........................................ 2000-113176

(51) Int. Cl.[7] .............................................. G06F 7/556
(52) U.S. Cl. ........................................ 708/512; 708/277
(58) Field of Search ................................ 708/277, 495, 708/512, 517

(56) References Cited

U.S. PATENT DOCUMENTS 5,365,465 A * 11/1994 Larson ........................ 708/204
5,570,310 A * 10/1996 Smith ......................... 708/517
5,703,801 A * 12/1997 Pan et al. .................... 708/517
5,831,878 A * 11/1998 Ishida ......................... 708/277
5,951,629 A * 9/1999 Wertheim et al. ........... 708/517
6,182,100 B1 * 1/2001 Schmookler ................ 708/277

FOREIGN PATENT DOCUMENTS

JP          2-216583          8/1990

* cited by examiner

*Primary Examiner*—David H. Malzahn
(74) *Attorney, Agent, or Firm*—McDermott, Will & Emery

(57) ABSTRACT

A logarithmic arithmetic unit includes first logarithmic operation part multiplying an exponent part of floating-point data by a prescribed value, a logarithmic table memory outputting a logarithmic value corresponding to bit data expressing a digit higher than a prescribed digit of a fixed-point part of the floating-point data, divisional precision decision part deciding divisional precision on the basis of the exponent part, division part performing division on a dividend obtained by subtracting the bit data from the fixed-point part and a divisor of the bit data and obtaining a result of division of a number of digits set on the basis of the divisional precision, second logarithmic operation part obtaining the logarithmic value of a value obtained by dividing the fixed-point part by the bit data and sum operation part adding outputs from the first and second logarithmic operation parts and the logarithmic table memory to each other.

18 Claims, 11 Drawing Sheets

RESULT OUTPUT FROM EXPONENTIAL TERM LOGARITHMIC OPERATION PART 12 (e×log2)

RESULT OUTPUT FROM LOGARITHMIC TABLE MEMORY 13 (logf0)

log(X)

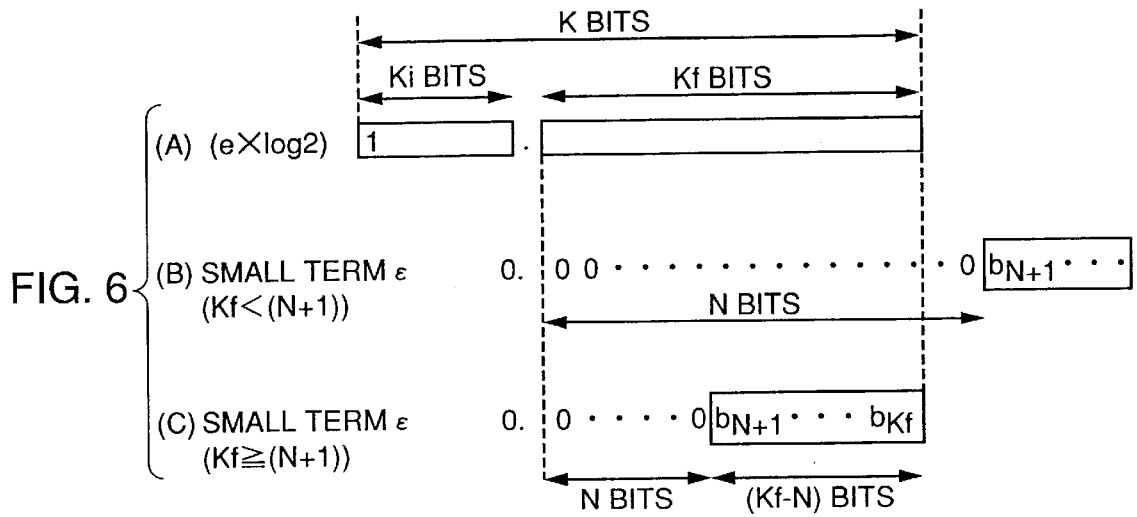
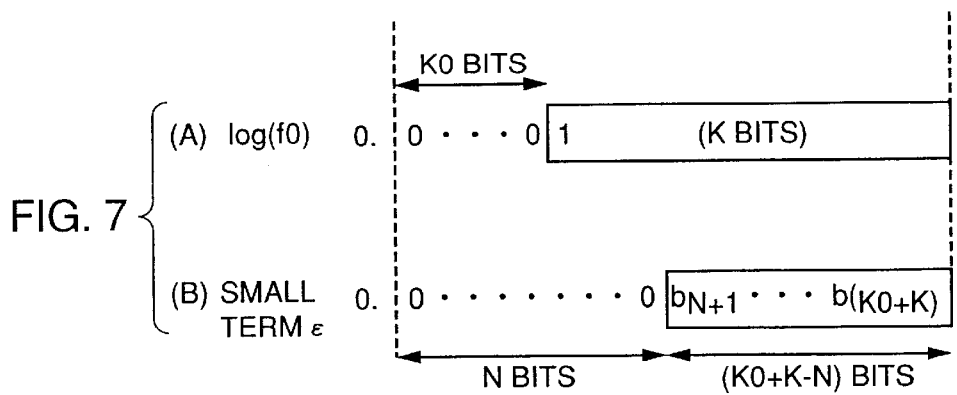

TO SMALL TERM LOGARITHMIC OPERATION PART 16

LOGARITHMIC ARITHMETIC UNIT AVOIDING DIVISION AS FAR AS PREDETERMINED ARITHMETIC PRECISION IS GUARANTEED

BACKGROUND OF THE INVENTION

1. Field of the Invention

The present invention relates to a logarithmic arithmetic unit, and more particularly, it relates to a logarithmic arithmetic unit carrying out logarithmic operations on floating-point data at a high speed.

2. Description of the Background Art

A logarithmic operation must be performed in order to position-control an industrial robot, and the logarithmic operation must be speeded up for operating the robot at a high speed. Japanese Patent Laying-Open No. 2-216583 (1990) proposes a method of executing a logarithmic operation by performing the following transformation on an exponent part $\beta$ and a fixed-point part $2^\alpha$ of floating-point data Y thereby operating logY:

$$logY = log(2^\alpha \times 2^\beta)$$
$$= \beta \times log2 + log(\phi + \Delta\phi)$$
$$\approx \beta \times log2 + log\phi + (\Delta\phi/\phi) - (\Delta\phi/\phi)^2 \quad (1)$$

where $\phi$ represents the high-order bit of the fixed-point part $2^\alpha$, and $\Delta\phi$ is expressed as $(2^\alpha - \phi)$. In the above expression (1), $log\phi$ is obtained through a logarithmic table with an address of the high-order bit of the fixed-point part $2\alpha$, while the remaining terms are obtained by arithmetic operations.

According to the logarithmic operation method employing the expression (1), the division $(\Delta\phi/\phi)$ must be performed. In order to calculate one digit of a result of division output in a binary number, the following processing (1) to (3) is generally performed:

(1) The dividend or a partial remainder is compared with the divisor.

(2) When the dividend or the partial remainder is greater than or equal to the divisor in the above item (1), 1 is set as a result bit while a value obtained by shifting a result of subtraction of the divisor from the dividend or the partial remainder one bit to the left is regarded as a new partial remainder.

(3) When the dividend or the partial remainder is less than the divisor in the above item (1), zero is set as a result bit while a value obtained by shifting the dividend or the partial remainder one bit; to the left is regarded as a new partial remainder.

While the result of division is sequentially obtained digit by digit by repeating the above processing (1) to (3), the division must be terminated on some digit. If the result of division is obtained up to an unnecessary digit, the processing is wasted and the processing time for the logarithmic operation is disadvantageously lengthened. Also when performing originally unnecessary division, the processing time for the logarithmic operation is disadvantageously lengthened.

SUMMARY OF THE INVENTION

Accordingly, an object of the present invention is to provide a logarithmic arithmetic unit and a logarithmic operation method performing a logarithmic operation at a high speed.

A logarithmic arithmetic unit according to an aspect of the present invention carries out logarithmic operations on floating-point data. The logarithmic arithmetic unit includes a first logarithmic operation part receiving an exponent part of the floating-point data for multiplying the exponent part by a prescribed value and obtaining the logarithm of 2 raised to the power specified by the exponent part, a logarithmic table memory storing a plurality of logarithmic values for receiving bit data expressing a digit higher than a prescribed digit of a fixed-point part of the floating-point data as an address and outputting a logarithmic value corresponding to the address, a divisional precision decision part receiving the exponent part of the floating-point data and deciding divisional precision on the basis of the exponent part, a division part connected to the divisional precision decision part for performing division on a dividend obtained by subtracting the bit data from the fixed-point part of the floating-point data and a divisor of the bit data and obtaining a result of division of a number of digits set on the basis of the divisional precision decided in the divisional precision decision part, a second logarithmic operation part connected to the division part for obtaining the logarithmic value of a value obtained by dividing the fixed-point part of the floating-point data by the bit data through the result of division in the division part and a sum operation part connected to the first logarithmic operation part, the logarithmic table memory and the second logarithmic operation part for adding outputs from the first logarithmic operation part, the logarithmic table memory and the second sum operation part to each other.

The arithmetic precision (divisional precision) of the division necessary for guaranteeing decided arithmetic precision of the logarithmic operation is recognizable from the exponent part of the floating-point data. Therefore, the division is performed to obtain the result up to the digit indicated by the divisional precision, so that the division may not be performed beyond necessity. Thus, the division is quickly terminated, so that the logarithmic operation can be performed at a high speed.

Preferably, the logarithmic arithmetic unit further includes a selection part connected to the divisional precision decision part and the second logarithmic operation part for selecting either zero or an operation value output from the second logarithmic operation part and supplying the selected value to the sum operation part in compliance with a selection control signal, and the divisional precision decision part generates a signal indicating whether or not to perform division on the basis of the exponent part and outputting the signal as the selection control signal.

When the divisional precision decision part determines that the result of division is zero, the selection part selects and outputs zero. The selection part outputs zero without waiting for the value output from the second logarithmic operation part. Therefore, the logarithmic operation can be executed at a higher speed.

More preferably, the logarithmic arithmetic unit further includes a determination circuit determining whether or not the value indicated by the exponent part is equal to a prescribed value and a selection part connected to the determination circuit and the first logarithmic operation part for selecting either zero or a value output from the first logarithmic operation part and supplying the selected value to the sum operation part in compliance with the result of determination of the determination circuit.

A value indicated by the exponent part when the value output from the first logarithmic operation part reaches zero is set as the prescribed value. Thus, the selection part can recognize whether or not the output from the first logarithmic operation part is zero by checking the result of determination of the determination circuit, for outputting zero without waiting for the output from the first logarithmic operation part when the output is zero. Thus, the logarithmic operation can be executed at a higher speed.

More preferably, the logarithmic arithmetic unit further includes a determination circuit determining whether or not the bit data is equal to a prescribed value and a selection part connected to the determination circuit and the logarithmic table memory for selecting either zero or a value output from the logarithmic table memory and supplying the selected value to the sum operation part in compliance with the result of determination of the determination circuit.

A value indicated by the bit data when the value output from the logarithmic table memory reaches zero is set as the prescribed value. Thus, the selection part can check whether or not the logarithmic value is zero by checking the result of determination of the determination circuit for outputting zero without waiting for the logarithmic value obtained by accessing the logarithmic table memory when the output from the logarithmic table memory is zero. Therefore, the logarithmic table memory may not store zero, leading to reduction of the memory capacity.

More preferably, the logarithmic arithmetic unit further includes a determination circuit determining whether or not bit data expressing a digit lower than a prescribed digit of the fixed-point part is equal to a prescribed value and a selection part connected to the determination circuit and the second logarithmic operation part for selecting either zero or a value output from the second logarithmic operation part and supplying the selected value to the sum operation part in compliance with the result of determination of the determination circuit.

A value indicated by the aforementioned bit data when the value output from the second logarithmic operation part reaches zero is set as the prescribed value. Thus, the selection part can check whether or not the output from the second logarithmic operation part is zero by checking the result of determination of the determination circuit, for outputting zero without waiting for the output from the second logarithmic operation part when the output is zero. Thus, the logarithmic operation can be executed at a high speed.

A logarithmic operation method according to another aspect of the present invention includes steps of obtaining a first value by multiplying an exponent part of floating-point data by a prescribed value, obtaining a second value serving as a logarithmic value for a value expressing a digit higher than a prescribed digit of a fixed-point part of the floating-point data, obtaining divisional precision on the basis of the exponent part, performing division on a dividend obtained by subtracting bit data expressing a digit higher than a prescribed digit of the fixed-point part of the floating-point data from the fixed-point part and a divisor of the bit data and obtaining a result of division of a number of digits set on the basis of the divisional precision, obtaining a third value serving as a logarithmic value of a value obtained by dividing the fixed-point part of the floating-point data by the bit data through the result of division and adding the first to third values to each other.

The arithmetic precision (divisional precision) of the division necessary for guaranteeing decided arithmetic precision of the logarithmic operation is recognizable from the exponent part of the floating-point data. Therefore, the division is performed to obtain the result up to the digit indicated by the divisional precision, so that the division may not be performed beyond necessity. Thus, the division is quickly terminated, so that the logarithmic operation can be performed at a high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an explanatory diagram for illustrating the relation between a small term $\epsilon$ and a first logarithmic function value;

FIG. 7 is an explanatory diagram for illustrating the relation between the small term $\epsilon$ and a second logarithmic function value;

DESCRIPTION OF THE PREFERRED EMBODIMENTS

[First Embodiment]

Figure 1:
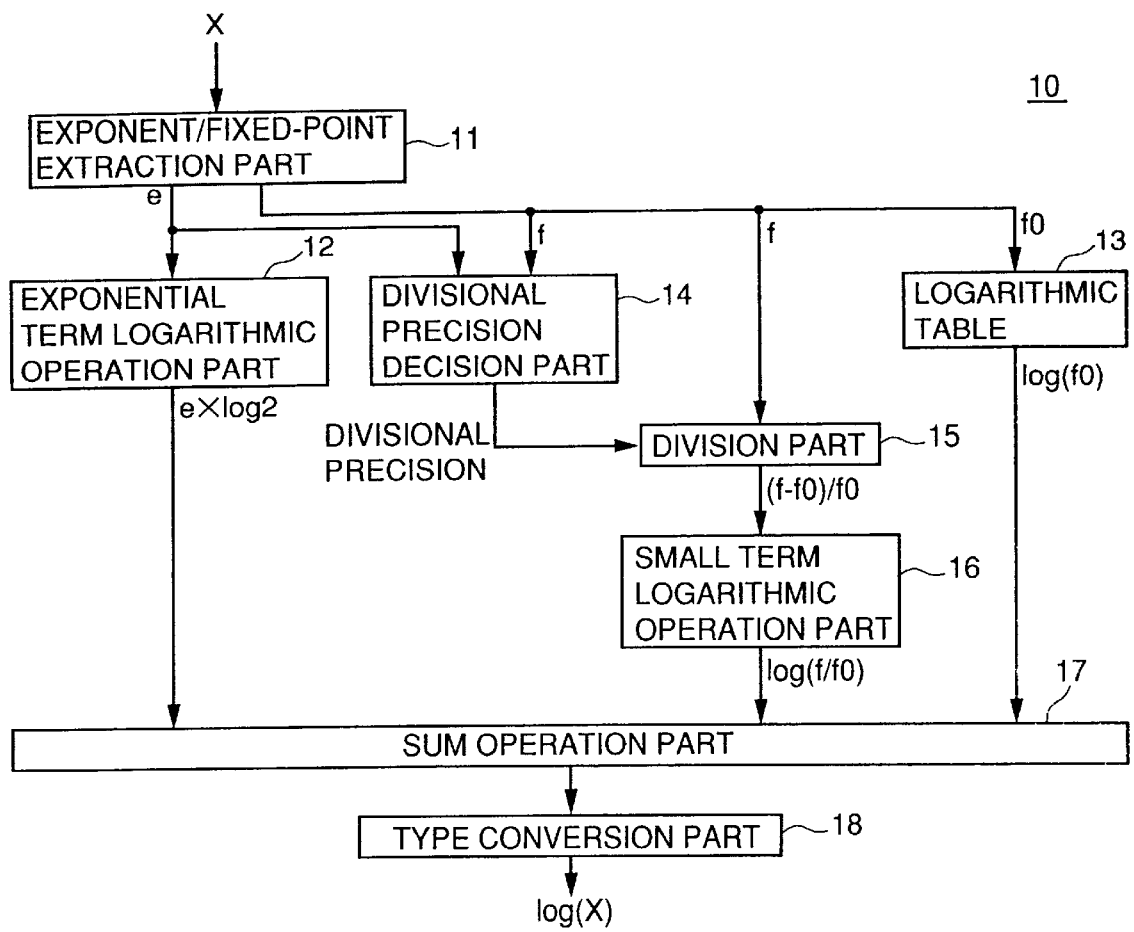
FIG. 1 is a block diagram showing the hardware structure of a logarithmic arithmetic unit according to a first embodiment of the present invention.

Referring to FIG. 1, a logarithmic arithmetic unit 10 according to a first embodiment of the present invention receives floating-point data X and outputs the logarithmic value log(X) thereof. The logarithmic arithmetic unit 10 is formed by a semiconductor integrated circuit integrated on a single semiconductor substrate. The base of the logarithm, which may basically be any arbitrary value except 1, is assumed to be the base (2.7182818 . . . ) of a natural logarithm in this embodiment.

The logarithmic arithmetic unit 10 includes an exponent/fixed-point extraction part 11 receiving the data X and extracting the exponent part e and the fixed-point part f of the data X, an exponential term logarithmic operation part 12 connected to the exponent/fixed-point extraction part 11 for performing a logarithmic operation on the exponent part e, a logarithmic table memory (hereinafter referred to as "logarithmic table") 13 connected to the exponent/fixed-point extraction part 11 for receiving the value f0 of a digit higher than a prescribed digit of the fixed-point part f and outputting the logarithmic value log(f0), a divisional precision decision part 14 connected to the exponent/fixed-point extraction part 11 for deciding arithmetic precision (hereinafter referred to as "divisional precision") of division on the basis of the exponent part e and the fixed-point part f and outputting precision data indicating the divisional precision, and a division part 15 connected to the exponent/fixed-point extraction part 11 and the divisional precision decision part 14 for receiving the fixed-point part f and the precision data from the exponent/fixed-point extraction part 11 and the divisional precision decision part 14 respectively and performing division on a dividend formed by (f−f0) and a divisor formed by f0 until reaching the divisional precision indicated by the precision data.

The logarithmic arithmetic unit 10 further includes a small term logarithmic operation part 16 connected to the division part 15 for receiving the result of division from the division part 15, performing a logarithmic operation through the result of division and obtaining the logarithmic value log(f/f0), a sum operation part 17 connected to the exponential term logarithmic operation part 12, the logarithmic table 13 and the small term logarithmic operation part 16 for calculating the sum of the values output from the connected elements and a type conversion part 18 connected to the sum operation part 17 for converting the result of a fixed decimal mode output from the sum operation part 17 to that of a floating decimal mode.

The floating-point data X received by the exponent/fixed-point extraction part 11 is data conforming to a format according to the IEEE (Institute of Electrical and Electronics Engineers) standard and consisting of a sign bit indicating a positive or negative sign, an exponent part of h bits expressing a biased integral value E, and a fixed-point part of k bits (h and k represent positive integers respectively). The fixed-point part tacitly expresses a binary number $1.a_1a_2 \ldots a_k$ by k-bit data "$a_1a_2 \ldots a_k$". It is known that h=8 and k=23 if the data X is single-precision, while h=11 and k=52 if the data X is double-precision.

Figure 2A:
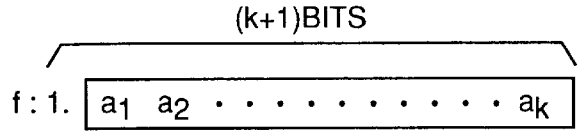
FIGS. 2A and 2B are block diagrams showing a fixed-point part f and a high-order bit f0 of the fixed-point part f.

The exponent/fixed-point extraction part 11 extracts the exponent part and the fixed-point part of the data X and generates an integral value e obtained by removing bias from the exponent part as a new exponent part while generating a value f obtained by adding 1 to the most significant bit of the fixed-point part as a new fixed-point part, where e represents a value (E−bias), bias represents a bias value of a certain integer, and f represents a decimal value (1+F) indicating the binary number "$1.a_1a_2 \ldots a_k$" by a bit string "$1a_1a_2 \ldots a_k$" of (k+1) bits as shown in FIG. 2A. Symbols e and f are hereinafter simply referred to as the exponent part and the fixed-point part respectively. It is impossible that an object logarithmic value is made negative in a logarithmic function, and hence it is presupposed that the data X is a positive value.

The logarithmic operation performed by the exponential term logarithmic operation part 12 on the exponent part e is multiplication of the exponent part e and a certain prescribed value. The exponential term logarithmic operation part 12 calculates (e×log2) in this embodiment. The exponential term logarithmic operation part 12 includes a two-input multiplier receiving the integral exponent part e in a first input and receiving the prescribed value (log2) expressed in the fixed-point data of (k+1) bits in a second input, for example.

Figure 2B:
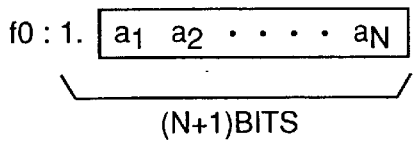

The logarithmic table 13 receives the value f0 of the high-order digit of the fixed-point part f output from the exponent/fixed-point extraction part 11 as an address, and outputs data from a memory area corresponding to this address. As shown in FIG. 2B, the value f0, i.e., the bit string $1a_1a_2 \ldots a_n$ of (N+1) bits excluding part of the lower side of the fixed-point part f expresses the decimal value "$1.a_1a_2 \ldots a_N$". Hence, k>N holds, where N represents a positive integer.

The data output from the logarithmic table 13 in response to the value f0 indicates the logarithmic value log(f0). The value f0 can take $2^N$ values. $2^N$ values of the logarithmic value log(f0) for the $2^N$ values of the value f0 are previously calculated. Therefore, the logarithmic table 13, formed by a nonvolatile memory such as a mask ROM (read only memory) or a flash memory, stores the previously calculated $2^N$ values of the logarithmic value log(f0) in memory areas specified by the value f0 respectively.

The most significant bits of all values of the value f0 are 1, and hence the most significant bits 1 may be omitted so that only N bits $a_1a_2 \ldots a_N$ are input in the logarithmic table 13 as the address.

The divisional precision decided in the divisional precision decision part 14 expresses the digit of the minimum degree of the result of division to be obtained in the division part 15.

The sum operation part 17 calculates the sum of the values output from the exponential term logarithmic operation part 12, the logarithmic table 13 and the small term logarithmic operation part 16 respectively, as described above. Therefore, the sum operation part 17 is formed by a three-input adder, for example. The result of this addition indicates the logarithm logX for the data X. The result of addition output from the sum operation part 17 is expressed in the fixed decimal mode.

The logarithmic operation method executed by the logarithmic arithmetic unit 10 is now described.

First, the input data X is expressed as follows:

$$X=(1+F) \times 2^{(E-bias)}$$

$$=f \times 2^e \quad (2)$$

The logarithm of the expression (2) is obtained as follows:

$$log(X)=e \times log2+log(f) \quad (3)$$

With the value f0, the second term on the right side of the expression (2) can be expressed as follows:

$$log(f)=log(f0)+log(f/f0)$$

$$=log(f0)+log(1+\epsilon) \quad (4)$$

The value f/f0 is defined as equal to (1+ε), and ε is referred to as a small term. Hence, the following expression (5) holds:

$$log(X)=e \times log2+log(f0)+log(1+\epsilon) \quad (5)$$

According to the present invention, the logarithmic operation is performed with the expression (5). In the following description, the values of the first to third terms on the right side of the expression (5) are referred to as first to third logarithmic function values respectively.

When expressing the logarithmic value log(X) in the floating decimal mode, both of the fixed-point part and the exponent part thereof require precision of the same numbers of bits as the fixed-point part and the exponent part of the input data X respectively. Therefore, it is assumed that the fixed-point part of the logarithmic value log(X) is expressed in precision of (k+1) bits inclusive of the most significant bit indicating "1". For convenience, it is hereinafter assumed that K=(k+1).

Figure 3:
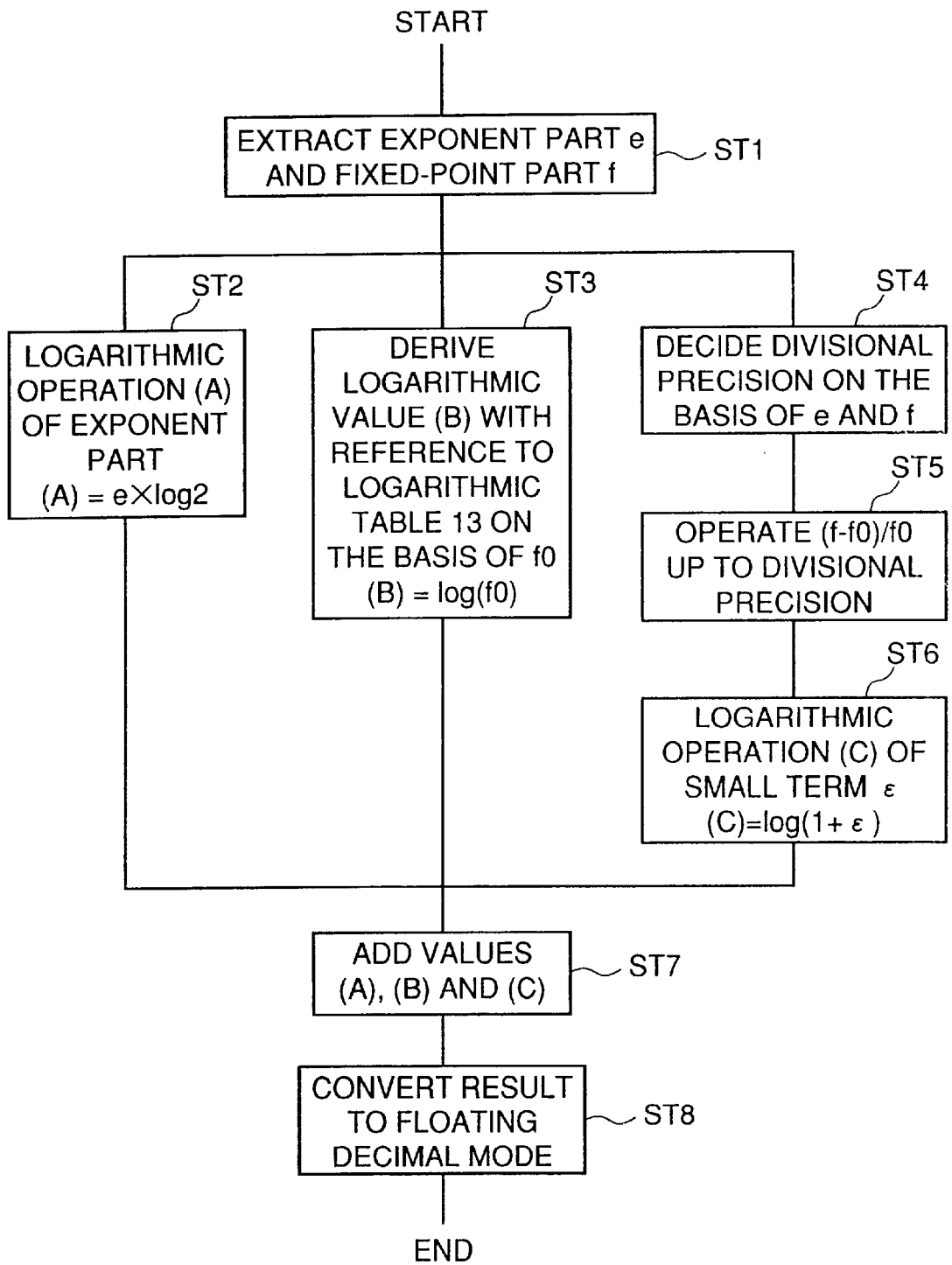
FIG. 3 is a flow chart of logarithmic operation processing performed by the logarithmic arithmetic unit according to the first embodiment.
Figure 4A:
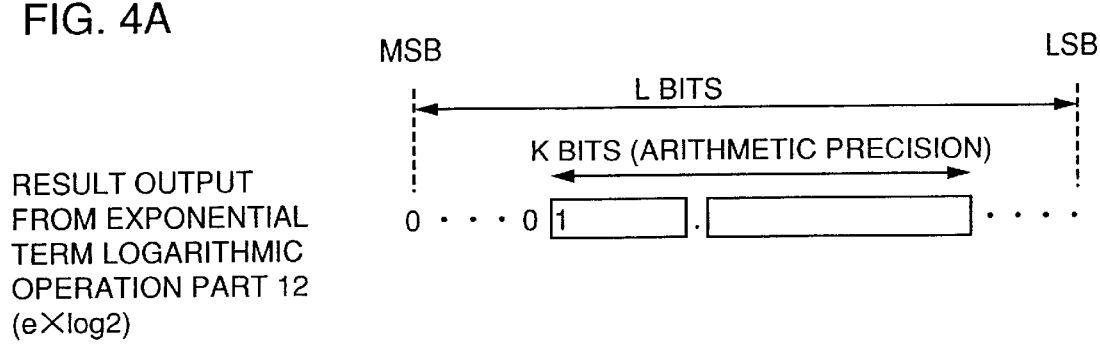
FIGS. 4A and 4B are block diagrams showing results output from an exponential term logarithmic operation part 12 and a logarithmic table 13 respectively.

The logarithmic operation method according to the present invention is now described with reference to FIG. 3. The exponent/fixed-point extraction part 11 extracts the exponent part e and the fixed-point part f (step ST1, hereinafter the term "step" is omitted). The exponential term logarithmic operation part 12 performs the logarithmic operation (e×log2), the first logarithmic function value, of the exponent part e (ST2). The exponential term logarithmic operation part 12 outputs the arithmetic result in the fixed decimal mode of L bits, where L represents a positive integer, as shown in FIG. 4A. Arithmetic precision necessary for the logarithmic operation (e×log2) is K bits, inclusive of the bit of the maximum degree where "1" first appears following the MSB (most significant bit) of the arithmetic result. The exponential term logarithmic operation part 12 also outputs a sign bit (not shown in FIG. 4A) indicating whether the arithmetic result is positive or negative.

Figure 4B:
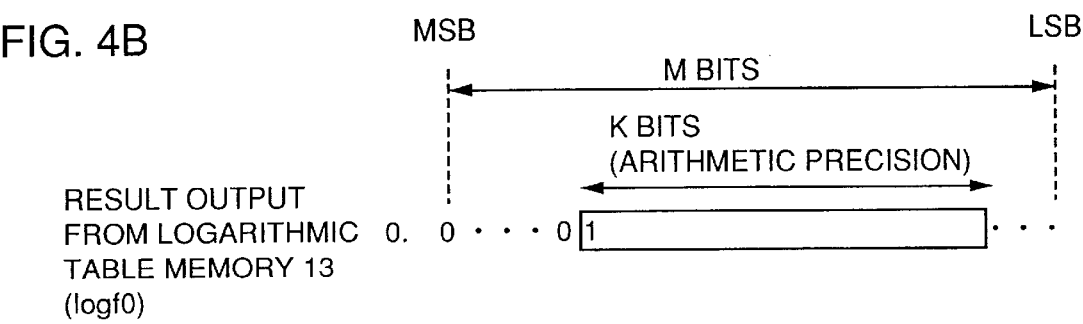

The second logarithmic function value log(f0) is derived (ST3) with reference to the logarithmic table 13 on the basis of the value f0 independently of ST2. As shown in FIG. 4B, the value output from the logarithmic table 13 is expressed in the fixed decimal mode of M bits, where M represents a positive integer. The most significant bit of the output value is the digit of $2^{-1}$, and arithmetic precision necessary for the logarithmic function value log(f0) is K bits, inclusive of the bit of the maximum degree where "1" first appears following the MSB. The value f0 is at least 1 and less than 2, and hence satisfies $0 \leq -\log(f0) < \log 2 = 0.10110 \ldots$.

The divisional precision decision part 14 decides the divisional precision (ST4) on the basis of the exponent e and the fixed-point part f, independently of ST2 and ST3. As described later, the divisional precision necessary for guaranteeing K bits, i.e., the arithmetic precision for the logarithmic value log(X), is readily obtained from the exponent part e and the fixed-point part f.

The division part 15 performs division (f−f0)/f0 (ST5), in order to obtain the small term $\epsilon$. The result of division is obtained up to the digit indicated by the divisional precision decided at ST4.

The dividend (f−f0) is a decimal having N decimal places of "0" and an (N+1)-th decimal place of "1". The dividend (f−f0) is expressed as "0.00 . . . 0$a_{N+1}a_{N+2}$ . . . $a_k$". On the other hand, the divisor f0 is the decimal "1.$a_1 a_2$ . . . $a_N$". Therefore, the small term $\epsilon$=(f−f0)/f0 reaches a decimal "0.00 . . . 0$b_{N+1} b_{N+2}$ . . . " where the maximum degree takable by "1" is the digit of $2^{-N-1}$. When the divisional precision is decided as the digit of the $2^{-w}$-th degree, the division part 15 obtains "0.00 . . . 0$b_{N+1} b_{N+2}$ . . . $b_w$" as the result of division, where W represents a positive integer greater than N.

The small term logarithmic operation part 16 performs a logarithmic operation (log(1+$\epsilon$)) of the small term $\epsilon$ (ST6). The logarithmic operation of the small term $\epsilon$, regarded as sufficiently less than 1, is approximated with secondary polynominal approximation as follows:

$$\log(1+\epsilon) = \epsilon - (\epsilon/2)^2 \qquad (6)$$

The small term logarithmic operation part 16 performs the arithmetic operation "$\epsilon - (\epsilon/2)^2$" with the small term $\epsilon$, and outputs the result as data of the fixed decimal mode.

The sum operation part 19 adds the first to third logarithmic function values obtained at ST2, ST3 and ST6 respectively to each other (ST7). The type conversion part 18 converts the result obtained at ST7 from the data of the fixed decimal mode to data of the floating decimal mode (ST8).

Figure 5:
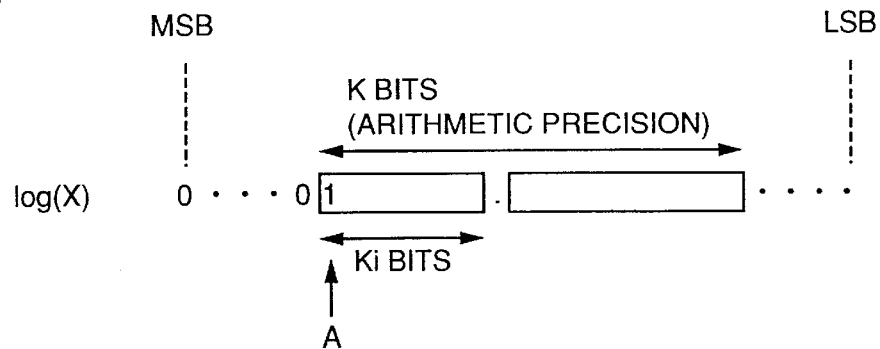
FIG. 5 is a block diagram showing a logarithmic operation result log(X) obtained by the logarithmic arithmetic unit.

FIG. 5 shows the result of addition (log(X)) expressed in the fixed decimal mode. In this result, K bits including the most significant bit A having the value 1 express the necessary arithmetic precision, and a bit string formed by slicing (K−1) bits from the bit of the degree lower by one digit than the bit A defines the fixed-point part of the converted result.

Assuming that Ki represents the number of bits, forming the integral part, from the bit A to the $2^0$-th bit, a value (Ki−1) expresses an exponent part with no bias after conversion. According to this embodiment, a biased exponent part depends on whether the exponent part e is positive or negative. The type conversion part 19 obtains the biased exponent part as {(Ki−1)−bias} when the exponent part e is positive, while obtaining the biased exponent part as {bias−(Ki−1)} when the exponent part e is negative.

The type conversion part 18 may include an incrementer. In this case, the type conversion part 18 rounds off or rounds up the arithmetic result received from the sum operation part 17 in response to the values of bits below the necessary arithmetic precision, and adds 1 to the final digit of the arithmetic precision with the incrementer for obtaining the fixed-point part of the arithmetic result.

An exemplary method of deciding the arithmetic precision for the aforementioned division is now described.

It is obvious that the small term $\epsilon$ has N decimal places of "0", as described above. FIGS. 6(A) to 6(C) show the precisional relation between the small term $\epsilon$ and the logarithmic function value (e×log2) obtained in the exponential term logarithmic operation part 12.

Referring to FIG. 6(A) showing an extract of the arithmetic precision part of the logarithmic function value (e×log2) in FIG. 4A, it is assumed that the integral part including the most significant bit 1 is expressed by Ki bits and the decimal places are expressed by Kf bits. K is equal to Ki+Kf.

FIG. 6(B) shows the small term e when the value Kf is less than (N+1). The maximum degree having 1 in the small term $\epsilon$ is lower than the minimum degree of the arithmetic precision of the logarithmic function value (e×log2). Referring to the expressions (5) and (6), the logarithmic function value (e×log2) and the small term $\epsilon$ are added for operating the logarithmic value log(X), while the addition of the logarithmic function value (e×log2) and the small term $\epsilon$ is equal to an operation of adding zero to the logarithmic value (e×log2) within the range of the arithmetic precision of the logarithmic value (e×log2).

When Kf is less than (N+1), therefore, no significant error results in the arithmetic result of the logarithmic value log(X) also when $\epsilon$=0. Hence, no division of $\epsilon$=(f−f0)/f0 may be performed.

FIG. 6(C) shows the small term $\epsilon$ when the value Kf is at least (N+1). In this case, the maximum degree having 1 in the small term $\epsilon$ is not lower than the minimum degree of the arithmetic precision of the logarithmic function value (e×log2) and hence it is meaningful to add the small term $\epsilon$ to the logarithmic function value (e×log2). However, the minimum degree required for the logarithmic function value (e×log2) is Kf decimal bits and hence it is sufficient to obtain the small term $\epsilon$ up to the Kf-th decimal bit. Hence, the arithmetic precision is satisfied by obtaining data of lower (Kf−N) bits from the $2^{-N-1}$-th bit.

If the exponent part e is zero, the logarithmic function value (e×log2) is also zero and hence the necessary number of digits of the small term ε must be obtained from the arithmetic precision of the logarithmic value log(f0).

FIGS. 7(A) and 7(B) show the precisional relation between the small term ε and the logarithmic value log(f0) obtained from the logarithmic table 13. FIG. 7(A) shows an extract of the logarithmic value log(f0) in FIG. 4B from the most significant $2^0$-th term to the minimum degree of the arithmetic precision. It is assumed that all bits of the logarithmic value log(f0) from the $2^{-1}$-th bit to the $2^{-K0}$-th bit are zero and the $2^{-K0-1}$-th bit is 1. FIG. 7(B) shows the small term ε having the relation N<(K0+K). In this case, the arithmetic precision is satisfied when data from the $2^{-(K0+1)}$-th bit to the $2^{-(K0+K)}$-th bit of the logarithmic value log(f0) are obtained. The arithmetic precision is satisfied when data of lower (K0+K−N) bits from the $2^{-N-1}$-th bit are obtained. According to calculation, a case of N≦(K0+K) is impossible and hence not taken into consideration.

In consideration of the above, the divisional precision decision part 14 decides the divisional precision for the division performed by the division part 15 as the $2^{-Kf}$-th decimal place when Kf≦(N+1) holds on the basis of the exponent part e, and outputs the value of the number (Kf−N) of digits from the $2^{-N-1}$-th digit to the $2^{-Kf}$-th digit to be obtained by the division part 15 as precision data. When Kf<(N+1) holds on the basis of the exponent part e, the divisional precision decision part 14 determines that the division part 15 may perform no division, and outputs zero as the precision data.

If the exponent part e is zero, the divisional precision decision part 14 decides the divisional precision as the decimal $2^{-(K0+K)}$-th place when (K0+K)>N holds on the basis of the high-order bit f0 of the fixed-point part f, and outputs the value of the number (K0+K−N) digits from the $2^{-N-1}$-th digit to the $2^{-K0-K}$-th digit to be obtained by the division part 15 as the divisional precision.

An exemplary structure of the divisional precision decision part 14 is described with reference to FIG. 8. The divisional precision decision part 14 includes a determination circuit 30 connected to the exponent/fixed-point extraction part 11 for determining whether or not the exponent part e is a prescribed value (zero) and a memory 31 connected to the exponent/fixed-point extraction part 11 and the determination circuit 30 for storing a value indicating the divisional precision. The memory 31 determines whether to output the value of the divisional precision in response to the exponent part e or in response to the high-order bit f0 of the fixed-point part f.

The memory 31 includes a memory area 32 connected to the exponent/fixed-point extraction part 11 for storing a first value indicating the divisional precision and outputting the first value in response to the exponent part e supplied as an address, a memory area 33 connected to the exponent/fixed-point extraction part 11 for storing a second value indicating the divisional precision and outputting the second value in response to the high-order bit f0 of the fixed-point part f supplied as an address and a selector 34 connected to the determination circuit 30 and the memory areas 32 and 33 for selecting the outputs from the memory areas 32 and 33 respectively in compliance with the result of determination of the determination circuit 30. The memory 31 is formed by a nonvolatile memory such as a mask ROM or a flash memory, for example.

The value N indicating the number of bits on the decimal places of the value f0 is optimally decided in consideration of various factors such as the chip area, the cost and the operation speed in the stage of designing the circuit structure of the logarithmic arithmetic unit. The exponent part e takes $2^h$ values. $2^h$ values of the logarithmic function value (e×log2) corresponding to the $2^h$ values of the exponent part e respectively are previously obtained by calculation. The values of Kf for the $2^h$ values of the logarithmic function value (e×log2) respectively are known and hence $2^h$ values of (Kf−N) corresponding to the $2^h$ values of the exponent part e respectively are readily obtained by previous calculation.

It is assumed that K and N are set as equal to 24 bits and 10 respectively. When e=2, for example, e×log2=1.0110 . . . , since log 2=0.10110 . . . . The number Ki of the bits forming the integral part is equal to 1 and hence the number Kf of the bits forming the decimal places is equal to (24−1)=23. Thus, it is understood that the divisional precision (Kf−N) for e=2 is equal to 23−10=13. Divisional precision for any value of the exponent e other than 2 is similarly obtained.

The memory area 32 previously stores $2^h$ values of (Kf−K) corresponding to respective addresses of the $2^h$ values of the exponent part e respectively as first values. For an arbitrary value satisfying (Kf−N) 0, indicating that no division is necessary as described above, among the $2^h$ values of the exponent part e, the memory area 32 stores not the value of (Kf−N) itself but zero.

On the other hand, the high-order bit f0 takes $2^N$ values. $2^N$ values of the logarithmic value log(f0) for the $2^N$ values of the high-order bit f0 are also previously obtained by calculation. values of K0 corresponding to the $2^N$ values of the logarithmic value log(f0) respectively are also known and hence $2^N$ values of (K0+K−N) corresponding to the $2^N$ values of the high-order bit f0 respectively are readily obtained by previous calculation. The memory area 33 previously stores $2^N$ values of (Kf−N) corresponding to respective addresses of the $2^N$ values of the high-order bit f0 respectively.

The selector 34 selects the output from the memory area 32 and supplies this output to the division part 15 when the determination circuit 30 determines that the exponent part e is zero.

An exemplary structure of the division part 15 is described with reference to FIG. 9. The division part 15 includes a detection circuit 38 connected to the divisional precision decision part 14 for detecting termination of division on the basis of the divisional precision decided in the divisional precision decision part 14, a division circuit 39 connected to the exponent/fixed-point extraction part 11 and the divisional precision decision part 14 for performing the division (f−f0)/f0 and a register 49 connected to the divisional precision decision part 14 for holding the divisional precision output from the divisional precision decision part 14.

When the detection circuit 38 detects termination of the division, the division circuit 39 sequentially obtaining the result of division bit by bit in descending order from the high-order bit is controlled to stop the processing and terminates the division.

The detection circuit 38 includes a counter 40 connected to the divisional precision decision part 14 and a comparator 41 connected to the counter 40. The counter 40 sets a certain initial value and performs sequential counting in synchronization with a clock signal. More specifically, the counter 40 sets the value indicating the divisional precision output from the divisional precision decision part 12 as the initial value and sequentially decrements the value one by one. The comparator 41 detects whether or not the count value of the counter 40 reaches zero indicating termination of the division, for outputting a result having a high level when the former reaches the latter while otherwise outputting a result having a low level.

The division circuit 39 includes a selector 42 connected to the exponent/fixed point extraction part 11, the comparator 41 and a selector 44 described later for receiving the outputs of the exponent/fixed-point extraction part 11 and the selector 44 as inputs and guiding either input to an output on the basis of the output from the comparator 41, a register 50 connected to the output of the selector 42 for temporarily holding a bit string output from the selector 42, a selector 43 connected to the exponent/fixed-point extraction part 11, the comparator 41 and a right shifter 46 described later for receiving the outputs of the exponent/fixed-point extraction part 11 and the right shifter 46 and guiding either input to an output on the basis of the output from the comparator 41, a register 51 connected to the output of the selector 43 for temporarily holding a bit string output from the selector 43, and the right shifter 46 connected to the register 51 for shifting the bit string held in the register 51 one bit to the right.

The division circuit 39 further includes a subtracter 45 connected to the registers 50 and 51 for subtracting the value B held in the register 51 from the value A held in the register 50, the selector 44 connected to the register 50 and the subtracter 45 for receiving the value A held in the register 50 and the result output from the subtracter 45 as inputs and guiding either input to an output on the basis of a sign bit indicating whether the result output from the subtracter 45 is positive or negative, a shift register 47 connected to the comparator 41 and the subtracter 45 for holding the sign bit output from the subtracter 45 while shifting a plurality of bits in compliance with the output from the comparator 41, and a register 48 connected to the outputs of the comparator 41 and the shift register 47 for loading and holding the value held in the shift register 47 in compliance with the output from the comparator 41.

The selector 42 receives the bit string "$a_{N+1}a_{N+2} \ldots a_k$" subsequent to the $2^{-N-1}$-th bit of the fixed-point part f output from the exponent/fixed-point extraction part 11 in a first input while receiving the bit string output from the selector 44 in a second input. The selector 42 selects and outputs the bit string input in the first input when the comparator 41 outputs a high level while selecting and outputting the bit string input in the second input when the comparator 41 outputs a low level.

The selector 43 receives the bit string "$1a_1a_2 \ldots a_N$" from the most significant bit to the $2^{-N}$-th bit of the fixed-point part f output from the exponent/fixed-point extraction part 11 in a first input while receiving the bit string output from the right shifter 46 in a second input. The selector 43 selects and outputs the bit string input in the first input when the comparator 41 outputs a high level while selecting and outputting the bit string input in the second input when the comparator 41 outputs a low level.

The right shifter 46 shifts the bit string held in the register 51 one bit to the right as described above, equivalently to a negative carry of the value B by one digit place.

The shift register 47 has a function of holding a plurality of bits for shifting the currently held values bitwise toward the MSB particularly when the comparator 41 outputs a low level and thereafter receiving and holding the sign bit in the LSB (least significant bit) thereof.

The register 48 loads and holds the value held in the shift register 47 responsively when the comparator 41 outputs a high level. When the comparator 41 outputs a high level, further, the register 48 holds each bit held in the shift register 47 and thereafter each bit of the shift register 47 is cleared to zero.

Figure 10:
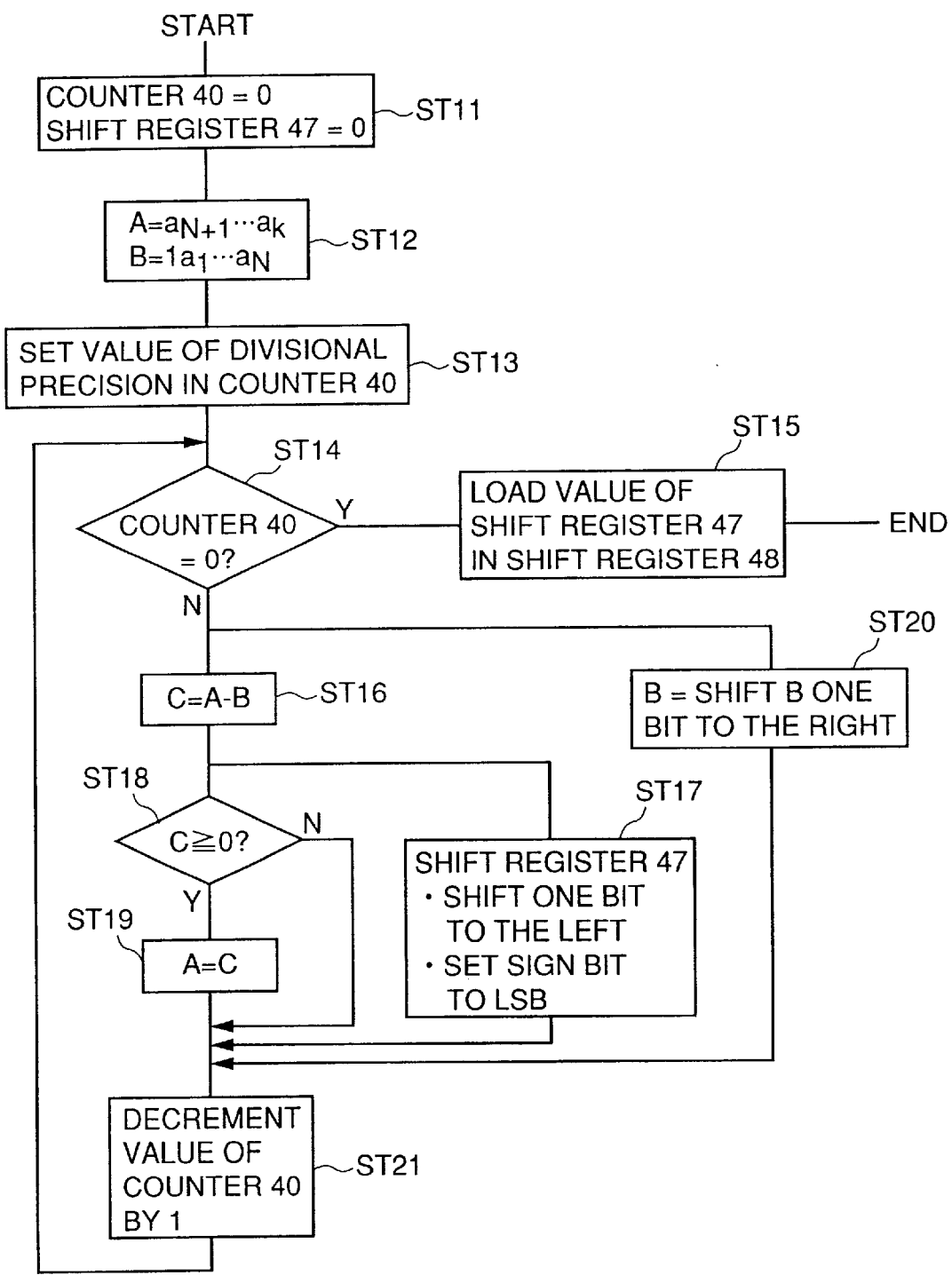
FIG. 10 is a flow chart of division performed by the division part 15.

Operations of the division part 15 are described with reference to FIG. 10.

The division part 15 performs the division on the dividend (f–f0) and the divisor f0. The bit string "$a_{N+1}a_{N+2} \ldots a_k$" expresses the dividend (f–f0), and the bit string "$1a_1a_2 \ldots a_N$" expresses the divisor f0.

First, the values held in the counter 40 and the shift register 47 are cleared to zero before performing the division (ST11).

At this point of time, the counter 40 holds zero and hence the comparator 41 outputs a high level. Therefore, the register 50 holds the dividend "$a_{N+1}a_{N+2} \ldots a_k$", set as the value A, through the selector 42. The register 51 holds the divisor "$1a_1a_2 \ldots a_N$", set as the value B, through the selector 43 (ST12).

Then, the counter 40 sets the value indicating the divisional precision as the initial value (ST13). The comparator 41 determines whether or not the value of the counter 40 is zero (ST14).

When the value of the counter 40 is zero (Y at ST14), the value held in the shift register 47 is transferred to the register 48 (ST15). Therefore, when the value indicating the divisional precision output from the divisional precision decision part 14 is zero, the register 48 holds zero to terminate the division. The register 48 holds zero as the result of division.

When the value of the counter 40 is nonzero (N at ST14), the subtracter 45 obtains a result C of subtraction (A–B) on the values A and B held in the registers 50 and 51 provided in the subtracter 45 respectively (ST16). The subtraction result C includes a sign bit indicating 1 when the subtraction result C is at least zero or indicating zero when the subtraction result C is negative.

The shift register 47 shifts each bit held therein one place to the left and thereafter sets the value of the sign bit of the subtraction result C to the least significant bit (ST17).

A determination is made as to whether or not the subtraction result C is at least zero (ST18) for defining the subtraction result C as the next value A (ST19) if the subtraction result C is at least zero (Y at ST18), while otherwise (N at ST18) defining the value A as the next value A as such with no change.

More specifically, the selector 44 selects the subtraction result C and outputs the same to the selector 42 when the sign bit of the subtraction result C is high while selecting the value A output from the selector 42 and outputting the same to the selector 42. The value held in the counter 40 is nonzero and hence the selector 42 selects the value output from the selector 44 and the register 50 holds the value output from the selector 44 as the next value A. The aforementioned operations implement ST18 and ST19.

When the value held in the counter 40 is determined as nonzero at ST14, the right shifter 46 shifts the bit string of the value B held in the register 51 one place to the right. The counter 40 holds nonzero and hence the selector 43 selects the value output from the right shifter 46 and the register 51 holds the value output from the right shifter 46 as the next value B (ST20).

For example, the right shifter 46 outputs "$01a_1a_2 \ldots a_N$" for an input of "$1a_1a_2 \ldots a_N$". The right shifter 47 may simply have a structure of displacing a wire for the bit string output from the selector 43 one bit to the right and connecting the same to the second input of the selector 43 for regularly inputting zero in the most significant bit of the second input of the selector 43.

The processing performed through ST17 to ST20 is substantially identical to that through the items (1) to (3) described with reference to the prior art. After the processing through ST17 to ST20, the counter 40 decrements the value held therein by 1 (ST21). After ST21, the process returns to ST14. The processing through ST16 to ST21 is repeated until the count value of the counter 40 reaches zero.

When the precision data output from the divisional precision decision part 14 is an integral value Z, the division part 15 outputs a bit string "0 ... 0$b_{N+1}b_{N+2}$ ... $b_{N+Z}$" having effective significant digits up to the Z-th bit from the least significant bit from the register 48.

More specifically, the loop returning from ST16 to ST14 through ST21 is repeated by a number of times equal to the integral value Z. At ST16, the subtracter 45 outputs values of the sign bit in order of $b_{N+1}, b_{N+2}, \ldots, b_{N+Z}$. After setting the sign bit at ST17 in the loop repeated Z times, the shift register 47 holds the following bit strings:

| Loop | Value of Shift Register 47 |
| --- | --- |
| First Time | 0......................0$b_{N+1}$ |
| Second Time | 0..............0$b_{N+1}b_{N+2}$ |
| ... | ... |
| Z-th Time | 0..0$b_{N+1}b_{N+2}...b_{N+Z}$ |

The value of the counter 40 reaches zero at Z-th ST21 and the comparator 41 detects termination of the division at (Z+1)-th ST14. The division circuit 39 terminates the division without obtaining lower bits. The register 48 holds the bit string "0 ... 0$b_{N+1}b_{N+2}$ ... $b_{N+Z}$" held in the shift register 47 at ST15.

The integral value Z indicating the divisional precision held in the register 49 and the bit string "$b_{N+1}b_{N+2}$ ... $b_{N+Z}$" held in the register 48 are supplied to the small term logarithmic operation part 16 as those indicating the small term $\epsilon$.

The value N is known and hence the small term logarithmic operation part 16 recognizes that the least significant bit of the bit string is the $2^{-N-Z}$-th digit on the basis of the value Z held in the register 49, and operates the right side $\epsilon-(\epsilon/2)^2$ of the expression (6). In order to perform this operation, the small term logarithmic operation part 16 includes a multiplier performing the multiplication $(\epsilon/2)^2$ and a subtracter subtracting the result of multiplication in the multiplier from the small term $\epsilon$. The small term logarithmic operation part 16 outputs the result of the operation in the fixed decimal mode.

The small term logarithmic operation part 16 is so formed as to recognize, when the register 49 holds zero, a value having all bits formed by 0 held in the register 48 as the small term $\epsilon=0$ and making the operation.

As hereinabove described, the number of digits necessary as the result of division can be suppressed to an extent causing no remarkable error in the finally obtained operation result of the logarithmic value log(X) by deciding the divisional precision on the basis of the exponent part e of the input data X. Thus, the logarithmic operation can be performed at a high speed while guaranteeing arithmetic precision necessary for the final operation result.

Similarly, the number of digits necessary as the result of division can be suppressed to an extent causing no remarkable error in the finally obtained operation result of the logarithmic value log(X) by deciding the divisional precision on the basis of the fixed-point part f of the input data X. It is effective to decide the arithmetic precision of the division on the basis of the fixed-point part f particularly when the exponent part e is zero.

[Second Embodiment]

Figure 11:
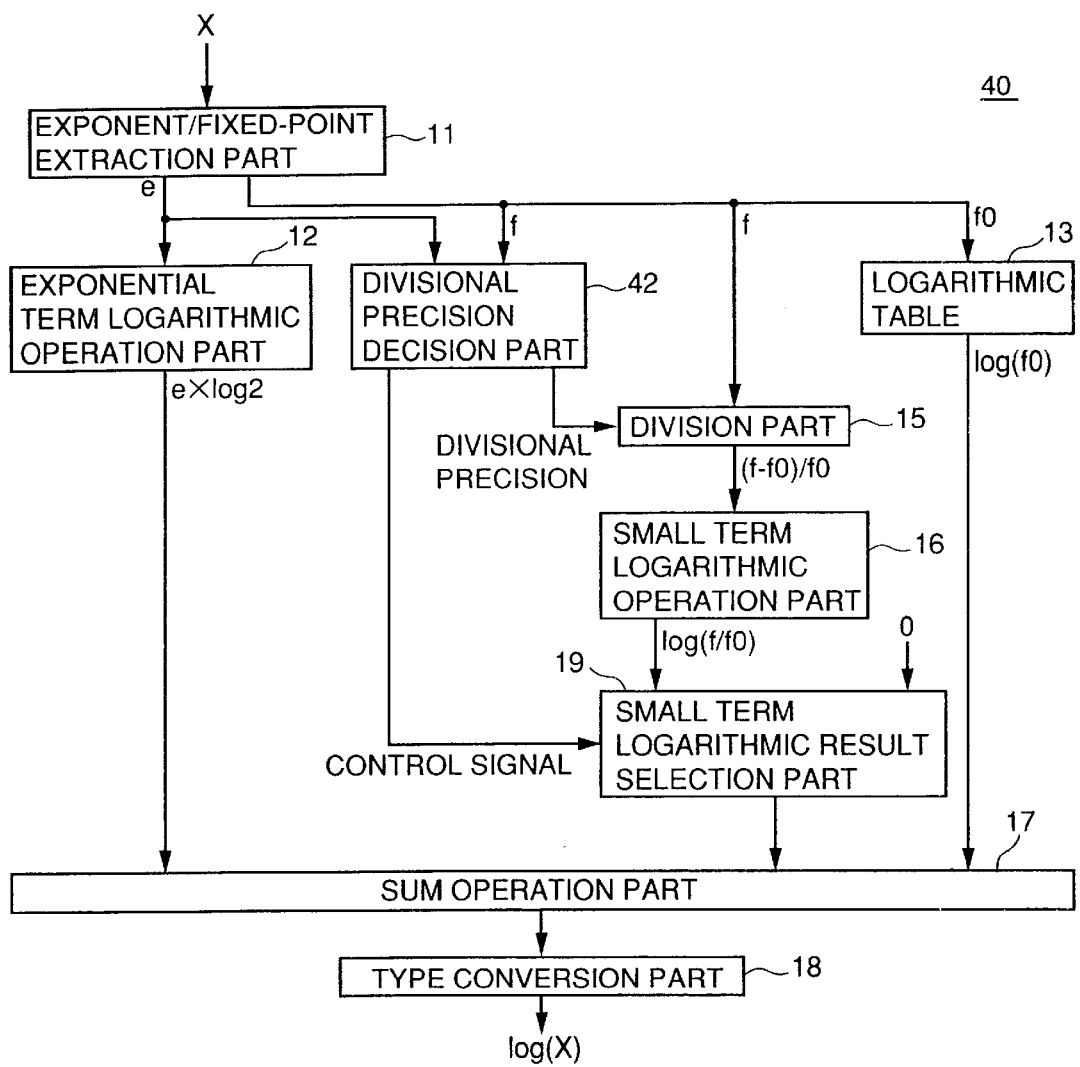
FIG. 11 is a block diagram showing the hardware structure of a logarithmic arithmetic unit according to a second embodiment of the present invention.

Referring to FIG. 11, a logarithmic arithmetic unit 40 according to a second embodiment of the present invention employs a divisional precision decision part 42 in place of the divisional precision decision part 14 in the hardware structure of the logarithmic arithmetic unit 10 according to the first embodiment described with reference to FIG. 1, and further includes a small term logarithmic operation part 16 and a small term logarithmic result selection part 19 connected to an output of the small term logarithmic operation part 16. A value output from the small term logarithmic result selection part 19 is supplied to a sum operation part 17 as a third logarithmic function value.

The divisional precision decision part 42 outputs a control signal indicating whether or not divisional precision coincides with zero. The small term logarithmic result selection part 19 selects zero when the control signal indicates "coincidence", while otherwise selecting the output from the small term logarithmic operation part 16.

When the divisional precision decision part 42 outputs zero as arithmetic precision, the third logarithmic function value is zero. According to the first embodiment, the division part 15 obtains the small term $\epsilon$ indicating zero and the small term logarithmic operation part 16 performs an operation with the small term $\epsilon$, to consequently output zero as the logarithmic value log(1+$\epsilon$).

According to the second embodiment, the small term logarithmic result selection part 19 outputs zero as the logarithmic value log(1+$\epsilon$) without waiting for the value obtained from the small term logarithmic operation part 16 when the divisional precision decision part 14 outputs zero as the arithmetic precision, whereby the logarithmic operation is performed at a higher speed.

Figure 12:
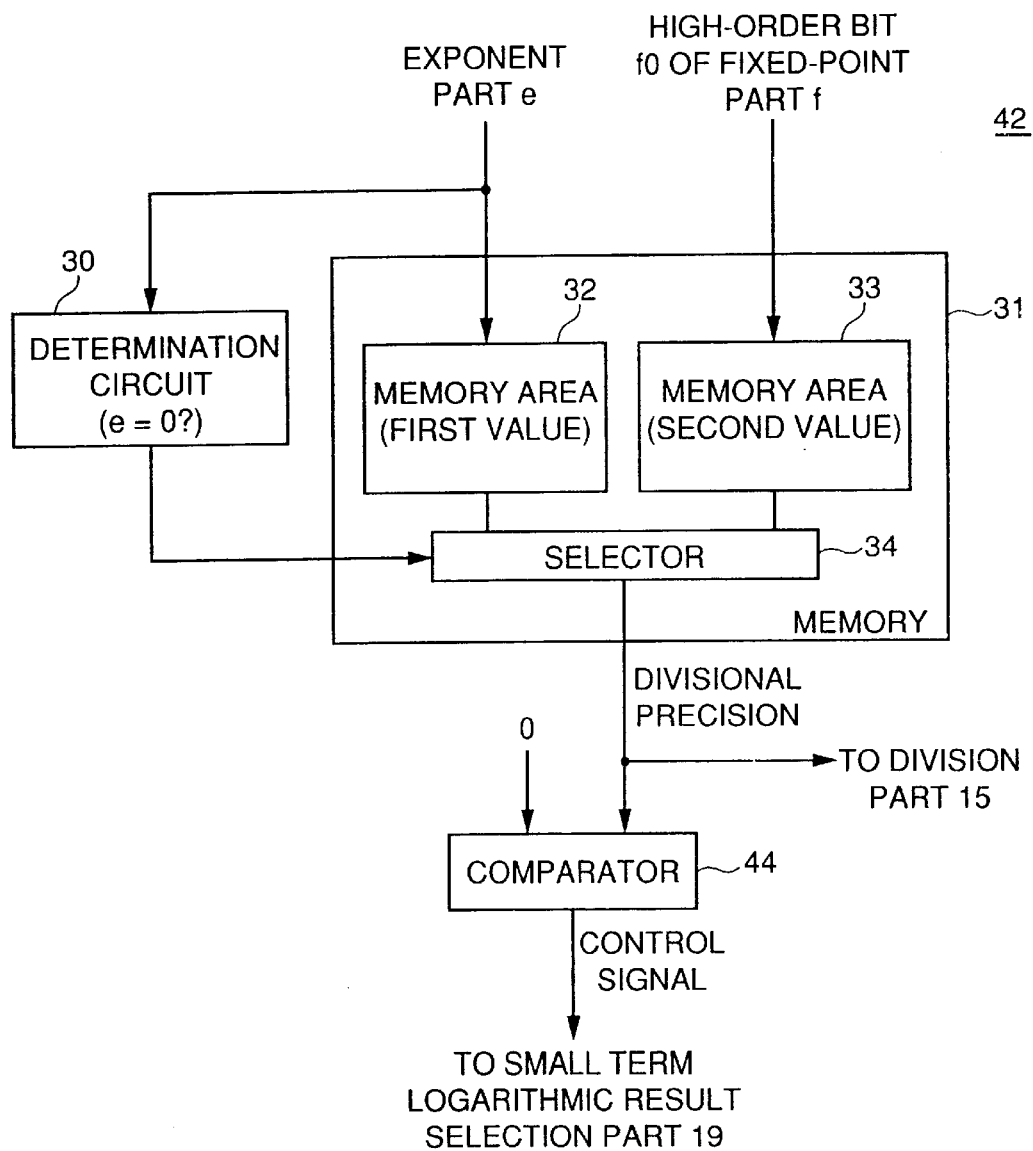
FIG. 12 is a block diagram showing the hardware structure of a divisional precision decision part 14 in the logarithmic arithmetic unit according to the second embodiment.

Referring to FIG. 12, the divisional precision decision part 42 further includes a comparator 44 connected to a selector 34 in the hardware structure of the divisional precision decision part 14 according to the first embodiment described with reference to FIG. 8. The comparator 44 detects whether arithmetic precision output from the selector 34 coincides with zero, for outputting a control signal having a high level when the former coincides with the latter while otherwise outputting a control signal having a low level. The control signal output from the comparator 44 is supplied to the small term logarithmic result selection part 19.

[Third Embodiment]

Figure 13:
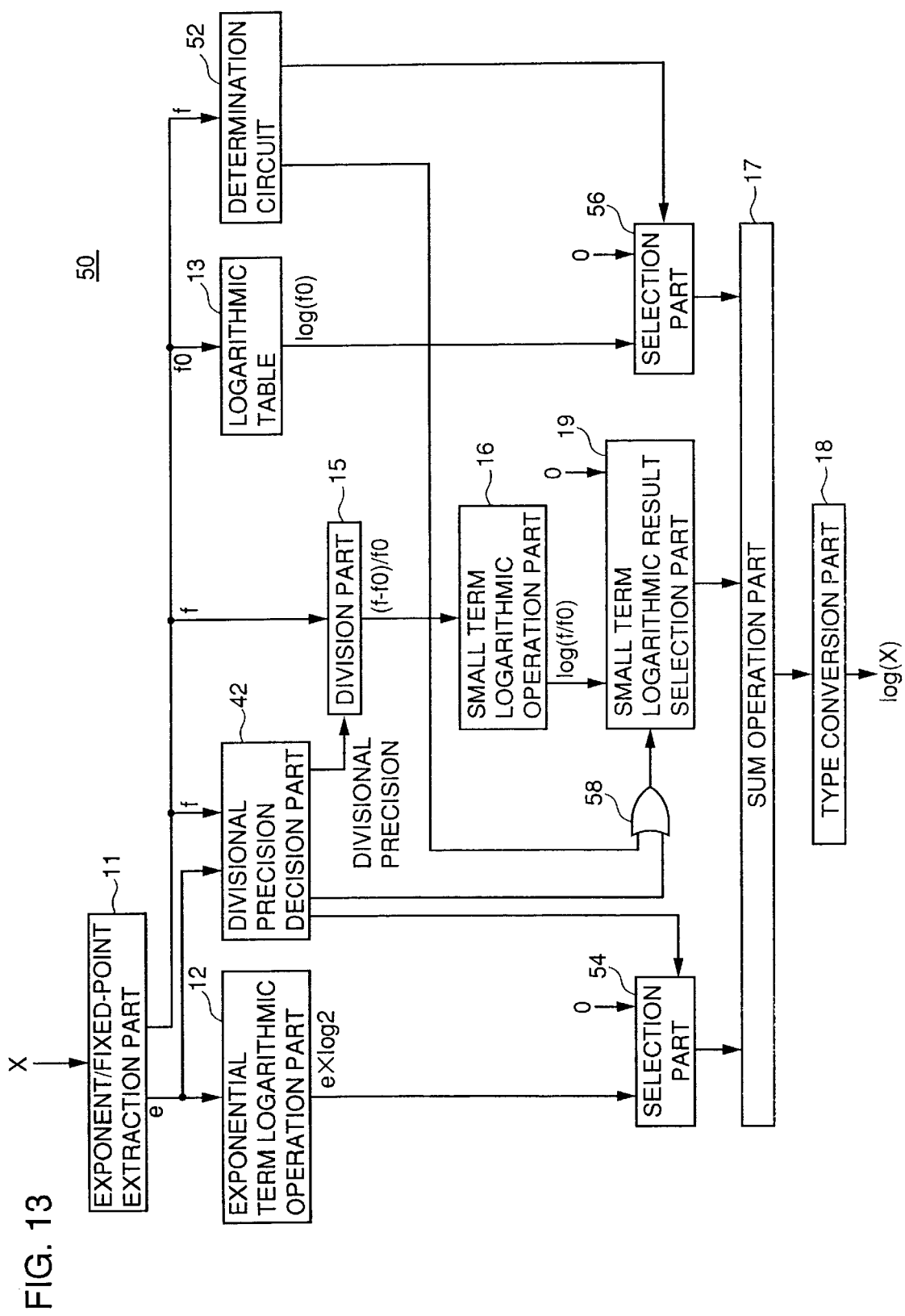
FIG. 13 is a block diagram showing the hardware structure of a logarithmic arithmetic unit according to a third embodiment of the present invention.

Referring to FIG. 13, a logarithmic arithmetic unit 50 according to a third embodiment of the present invention further includes a determination circuit 52 connected to an exponent/fixed-point extraction part 11, a selection part 54 connected to an exponential term logarithmic operation part 12 and a divisional precision decision part 42, a selection part 56 connected to a logarithmic table 13 and the determination circuit, 52 and a logic gate 58 connected to the divisional precision decision part 42 and the determination circuit 52.

A sum operation part 17 is connected with an output of the selection part 56 in place of that of the logarithmic table 13, and connected with an output of the selection part 54 in place of that of the exponential term logarithmic operation part 12.

The determination circuit 52 receives a fixed-point part f from the exponent/fixed-point extraction part 11 for determining whether or not a value f0 forming the high-order bit thereof indicates 1 and outputting a high first result of determination when the value f0 is 1 while otherwise outputting a low first result of determination. The determination circuit 52 includes a first detection circuit detecting whether or not all of N bits of decimal places of the fixed-point part f (1.a₁a₂ ... a_k) are zero and outputting the first result of determination.

The determination circuit 52 also determines whether or not a value (f−f0) is zero, for outputting a high second result of determination when the value (f−f0) is zero while otherwise outputting a low second result of determination. Therefore, the determination circuit 52 includes a second detection circuit detecting whether or not all of (k−N) bits of the fixed-point part f from the $2^{-N-1}$-th digit to the $2^{-k}$-th digit are zero and outputting the second result of determination.

On the basis of a result of determination output from a determination circuit 30 provided in the divisional precision decision part 42, the selection part 54 selects and outputs either zero or an output from the exponential term logarithmic operation part 12. On the basis of the result of determination output from the determination circuit 52, the selection part 56 selects and outputs either zero or an output from the logarithmic table 13.

The logic gate 58 performs a logical operation of a control signal output from a comparator 44 provided in the divisional precision decision part 42 and the second result of determination output from the determination circuit 52. More specifically, the logic gate 58 ORs the control signal and the second result of determination. A small term logarithmic result selection part 19 receives the result output from the logic gate 58 as a control signal, for selecting zero when the control signal is high while selecting an output of a small term logarithmic operation part 16 when the control signal is low. Thus, the small term logarithmic result selection part 19 selects zero when the value f0 indicates 1 or the value (f−f0) indicates zero.

The sum operation part 17 operates the sum of the three outputs from the selection parts 19, 54 and 56.

Figure 14:
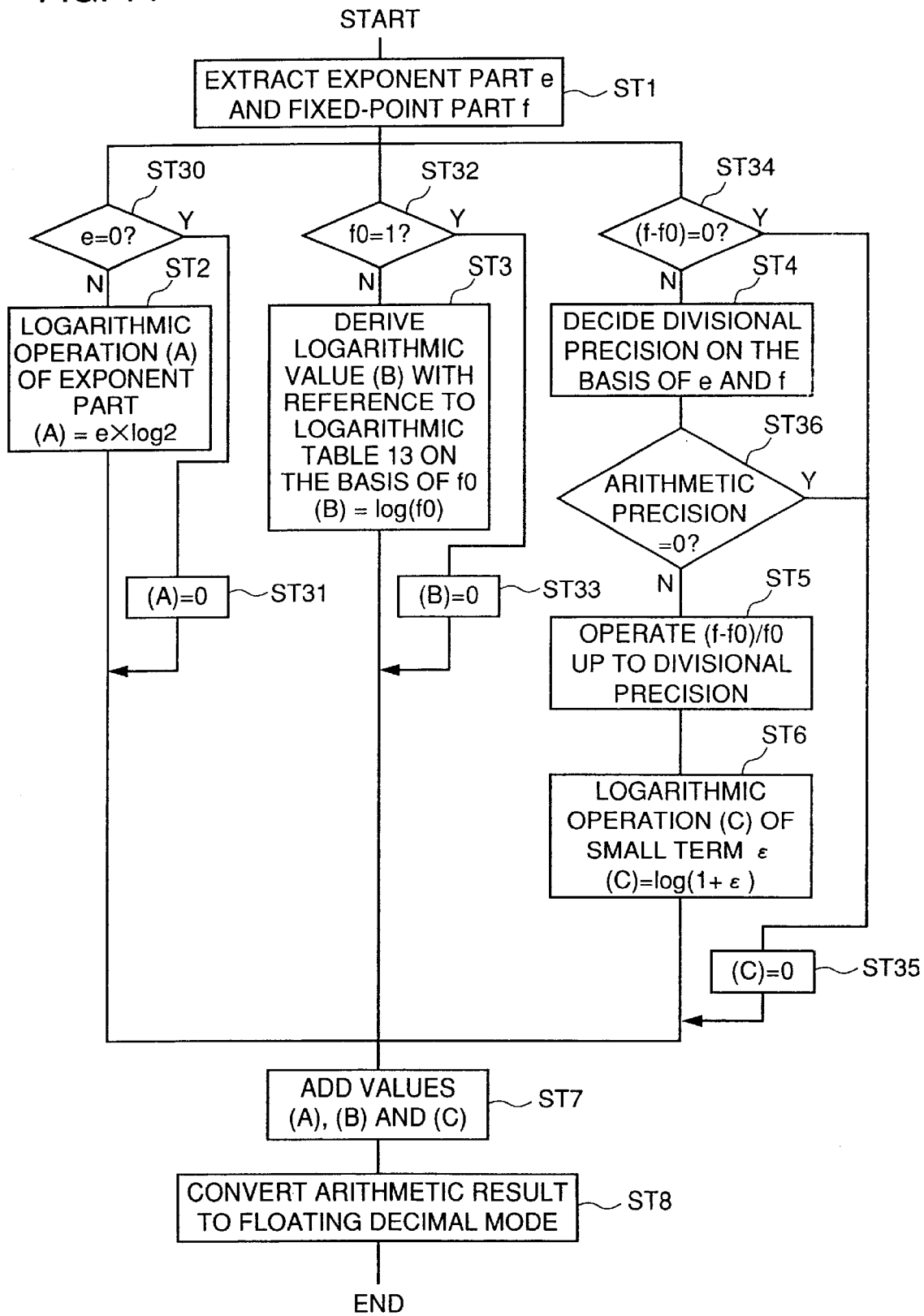
FIG. 14 is a flow chart of logarithmic operation processing performed by the logarithmic arithmetic unit according to the third embodiment.

Logarithmic operation processing employing the logarithmic arithmetic unit 50 is described with reference to FIG. 14. ST30 to ST36 are newly added to this logarithmic operation processing, while the remaining steps are identical to those shown in FIG. 3. Therefore, redundant description is not repeated.

At ST30, the determination circuit 30 of the divisional precision decision part 42 determines whether or not an exponent part e is zero. When the exponent part e is zero (Y at ST30), zero is obtained as a first logarithmic function value (A) (ST31). More specifically, the selection part 54 selects zero and outputs the same to the sum operation part 17. In this case, the exponential term logarithmic operation part 12 may be so formed as to perform no operation when receiving the exponent part e.

When the exponent part e is nonzero (N at ST30), the process advances to ST2. The selection part 54 selects the operation result of the exponent part logarithmic operation part 12 and outputs the same to the sum operation part 17.

When the exponent part e is zero, the first logarithmic function value (e×log2) is zero. According to this embodiment, the selection part 54 selects and outputs zero when the exponent part e is zero, and hence the first logarithmic function value (A) can be obtained without waiting for the operation result in the exponential term logarithmic operation part 12.

The determination circuit 52 determines whether or not the value f0 indicates 1 at ST32, independently of ST30. When the value f0 is 1 (Y at ST32), zero is obtained as a second logarithmic function value (B) (ST33). More specifically, the selection part 56 selects zero and outputs the same to the sum operation part 17. In this case, the logarithmic table 13 may be so formed as not to access corresponding storage contents when receiving the value f0 as an address. When the value f0 does not indicate 1 (N at ST32), the process advances to ST3. The selection part 56 selects the result output from the logarithmic table 13 and outputs the same to the sum operation part 17.

When the value f0 is 1, the second logarithmic function value log(f0) is zero. According to this embodiment, the selection part 56 selects and outputs zero when f0=1, and hence the second logarithmic function value (B) can be obtained without waiting for the logarithmic value obtained by accessing the logarithmic table 13. Further, the logarithmic table 13 may not store a bit string "00 ... 0" in correspondence to the address of f0=1, and hence the capacity of the logarithmic table 13 can effectively be reduced.

Independently of ST30 and ST32, the determination circuit 52 determines whether or not the value (f−f0) indicates zero at ST34. When the value (f−f0) is zero (Y at ST34), zero is obtained as a third logarithmic value (C) (ST35). More specifically, the small term logarithmic result selection part 19 selects zero and outputs the same to the sum operation part 17. In this case, the division part 15 may be so formed as to perform no division when receiving the fixed-point part f.

When the value (f−f0) is nonzero (N at ST34), the process advances to ST4. At ST36, the comparator 44 shown in FIG. 12 determines whether or not divisional precision is zero. When the divisional precision is zero (Y at ST36), i.e., when the comparator 44 determines that no division may be performed, the small term logarithmic result selection part 19 selects zero and outputs the same to the sum operation part 17 (ST35). In this case, the division part 15 is so formed as not to output the operation result. When the divisional precision is nonzero (N at ST36), the process advances to ST5. The selection part 56 selects the operation result of the small term logarithmic operation part 16 and outputs the same to the sum operation part 17.

When the arithmetic precision is zero or the value (f−f0) is zero, the third logarithmic function value log(1+ε) is zero. According to this embodiment, the selection part 19 selects zero also when the value (f−f0) is zero in compliance with the second result of determination of the determination circuit 52 in addition to the case when the divisional precision decided in the divisional precision decision part 14 is zero. Therefore, the third logarithmic function value (C) can be obtained without waiting for the operation results of the division part 15 and the small term logarithmic operation part 16.

The selection part 19 is shared when the divisional precision is zero and when the value (f−f0) is zero, whereby the hardware structure is reduced.

[Fourth Embodiment]

In each of the first to third embodiments, the divisional precision decision part 14 (42) may decide the divisional precision only through the exponent part e. The method of deciding the arithmetic precision from the exponent part e is identical to that in the first embodiment. For the logarithmic function value (e×log2) corresponding to the exponent part e, the arithmetic precision may be set to a value (Kf−N) when Kf≦(N+1) or set to zero when Kf<(N+1).

Figure 8:
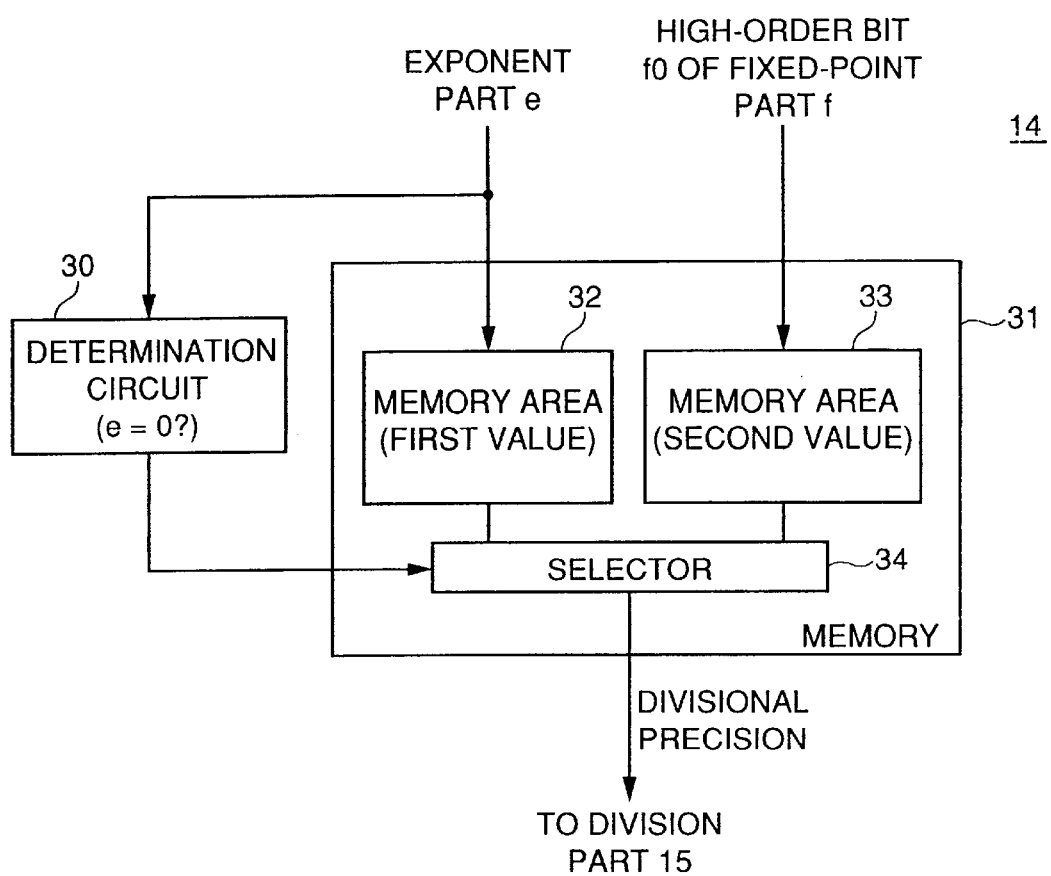
FIG. 8 is a block diagram showing the hardware structure of a divisional precision decision part 14.

The structure of this divisional precision decision part 14 is obtained by removing the determination circuit 30, the memory area 33 and the selector 34 and supplying the output of the memory 31 to the divider 15 in the divisional precision decision part 14 shown in FIG. 8. When applying this divisional precision decision part 14 to the third embodiment, the determination circuit 30 may be separately prepared in the logarithmic arithmetic unit for generating a selection signal for the selection part 54.

If the exponent part e serving as an address is zero, the memory 31 outputs a value of K bits, which is necessary arithmetic precision, as data corresponding to the address. Therefore, it follows that the division part 15 obtains values of bits from the (N+1)-th decimal place to the (N+K)-th decimal place of the small term ε.

In a logarithmic arithmetic unit according to a fourth embodiment of the present invention, division is retarded as compared with the logarithmic arithmetic unit according to the first embodiment only when the exponent part e is zero, while the amount of hardware forming the divisional precision decision part 14 is reduced. Therefore, the chip area of the logarithmic arithmetic unit can be reduced.

[Other Modifications]

Some modifications of the first to fourth embodiments are now described.

(1) Each of the logarithmic table 13 and the memory 31 of the divisional precision decision part 42 may be formed by a random access memory (RAM). In this case, the logarithmic arithmetic unit is so structured that a value to be stored is externally written every time power is supplied or a reset signal is applied.

Figure 9:
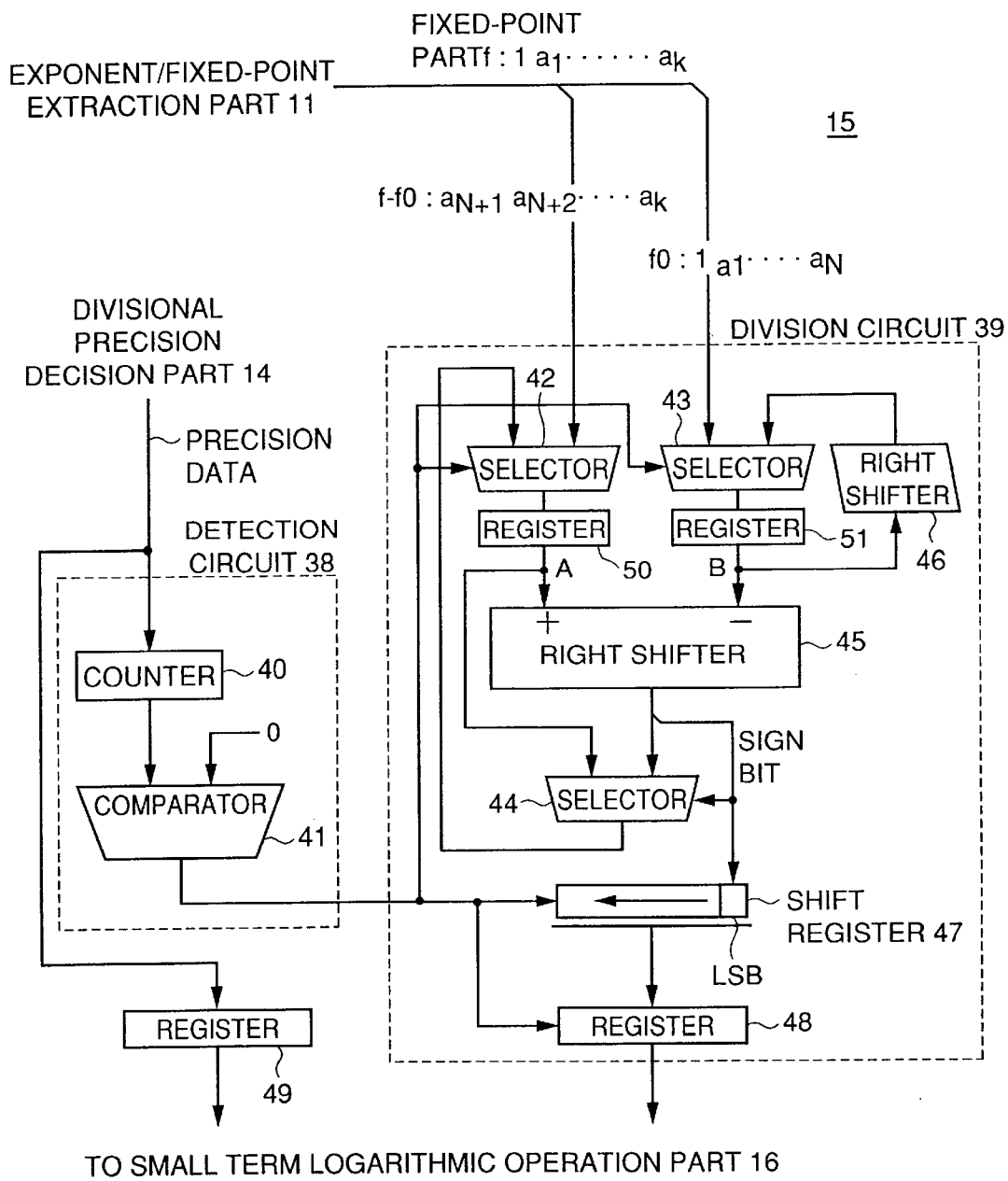
FIG. 9 is a block diagram showing the hardware structure of a division part 15.

(2) In place of the structure shown in FIG. 9, the detection circuit 38 may be formed by a counter setting zero as an initial value and successively incrementing the same one by one in synchronization with a clock signal and a comparator detecting whether or not the value output from the counter coincides with a value indicated by divisional precision and outputting the result of detection to the division circuit 39 as a signal indicating termination of division.

(3) In place of the memory 31 shown in FIG. 12, the divisional precision decision part 42 may include a memory provided with a memory area outputting a value indicating corresponding divisional precision in response to a single address and a selector selecting the exponent part e as an address and supplying the same to the memory area when the determination circuit 30 determines that the exponent part e is zero while otherwise selecting the high-order bit f0 as the address and supplying the same to the memory area. In this case, 1-bit data for identifying whether the address is the exponent part e or the high-order bit f0 must be added to the address. The memory area stores both of the divisional precision corresponding to the exponent part e and the divisional precision corresponding to the high-order bit f0.

(4) The exponential term logarithmic operation part 12 may be formed by a memory receiving the exponent part e as an address and outputting a previously stored logarithmic function value (exlog2) in response to the address.

(5) In place of the right shifter 46 and the selector 43 shown in FIG. 9, the division part 15 may include a left shifter supplying a value obtained by shifting the bit string output from the selector 44 one place to the left, i.e., a value obtained by shifting the value indicated by the bit string one place upward to the second input of the selector 42. The register 51 holds the divisor as such.

As hereinabove described, the logarithmic arithmetic unit according to the present invention including the divisional precision decision part deciding the divisional precision on the basis of the exponent part and the division part performing division with the fixed-point part of the floating-point data for obtaining a result of division up to the digit indicated by the decided divisional precision may not perform the division beyond necessity. Thus, the logarithmic arithmetic unit can perform logarithmic operations at a high speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A logarithmic arithmetic unit for carrying out logarithmic operations on floating-point data, including:

a first logarithmic operation part receiving an exponent part of said floating-point data for multiplying said exponent part by a prescribed value and carrying out logarithmic operations on 2 raised to the power specified by said exponent part;

a logarithmic table memory storing a plurality of logarithmic values for receiving bit data expressing a digit higher than a prescribed digit of a fixed-point part of said floating-point data as an address and outputting a logarithmic value corresponding to said address;

a divisional precision decision part receiving said exponent part of said floating-point data and deciding divisional precision on the basis of said exponent part;

a division part connected to said divisional precision decision part for performing division on a dividend obtained by subtracting said bit data from said fixed-point part of said floating-point data and a divisor of said bit data and obtaining a result of division of a number of digits set on the basis of said divisional precision decided in said divisional precision decision part;

a second logarithmic operation part connected to said division part for obtaining the logarithmic value of a value obtained by dividing said fixed-point part of said floating-point data by said bit data with said result of division of said division part; and a sum operation part connected to said first logarithmic operation part, said logarithmic table memory and said second logarithmic operation part for adding outputs from said first logarithmic operation part, said logarithmic table memory and said second sum operation part to each other.

2. The logarithmic arithmetic unit according to claim 1, wherein said divisional precision decision part includes a memory storing a value indicating said divisional precision, receiving said exponent part as an address and outputting divisional precision corresponding to said address.

3. The logarithmic arithmetic unit according to claim 1, wherein said divisional precision decision part receives said bit data for deciding said divisional precision on the basis of said bit data.

4. The logarithmic arithmetic unit according to claim 3, wherein said divisional precision decision part stores first and second values indicating said divisional precision and includes a memory outputting said first value in response to said exponent part and another memory outputting said second value in response to said bit data.

5. The logarithmic arithmetic unit according to claim 3, wherein said divisional precision decision part decides said divisional precision in compliance with either said bit data or said exponent part on the basis of the value of said exponent part.

6. The logarithmic arithmetic unit according to claim 5, wherein said divisional precision decision part includes:

a memory storing first and second values indicating said divisional precision and outputting said first value in response to said exponent part while outputting said second value in response to said bit data, and a determination circuit connected to said memory for determining whether or not the value indicated by said exponent part is a prescribed value and controlling said memory to selectively output either said first value or said second value on the basis the result of determination.

7. The logarithmic arithmetic unit according to claim 1, wherein said division part includes:

a detection circuit connected to said divisional precision decision part for detecting termination of division on the basis of said divisional precision, and a division circuit connected to said detection circuit for performing division with said fixed-point part and terminating division on the basis of an output from said detection circuit, and said detection circuit includes:

a counter circuit setting an initial value in compliance with a control signal and performing counting from said initial value in synchronization with a clock signal, and a comparator connected to said counter circuit for comparing the count value of said counter circuit with a value indicating termination of division.

8. The logarithmic arithmetic unit according to claim 1, further including a selection part connected to said divisional precision decision part and said second logarithmic operation part for selecting either zero or an operation value output from said second logarithmic operation part and supplying the selected value to said sum operation part in compliance with a selection control signal, wherein said divisional precision decision part generates a signal indicating whether or not to perform division on the basis of said exponent part and outputting said signal as said selection control signal.

9. The logarithmic arithmetic unit according to claim 1, further including:

a determination circuit determining whether or not the value indicated by said exponent part is equal to a prescribed value, and a selection part connected to said determination circuit and said first logarithmic operation part for selecting either zero or a value output from said first logarithmic operation part and supplying the selected value to said sum operation part in compliance with the result of determination of said determination circuit.

10. The logarithmic arithmetic unit according to claim 1, further including:

a determination circuit determining whether or not said bit data is equal to a prescribed value, and a selection part connected to said determination circuit and said logarithmic table memory for selecting either zero or a value output from said logarithmic table memory and supplying the selected value to said sum operation part in compliance with the result of determination of said determination circuit.

11. The logarithmic arithmetic unit according to claim 1, further including:

a determination circuit determining whether or not bit data expressing a digit lower than a prescribed digit of said fixed-point part is equal to a prescribed value, and a selection part connected to said determination circuit and said second logarithmic operation part for selecting either zero or a value output from said second logarithmic operation part and supplying the selected value to said sum operation part in compliance with the result of determination of said determination circuit.

12. A logarithmic operation method for carrying out a logarithmic operation on floating-point data, including steps of:

obtaining a first value by multiplying an exponent part of said floating-point data by a prescribed value;

obtaining a second value serving as a logarithmic value for a value expressing a digit higher than a prescribed digit of a fixed-point part of said floating-point data;

obtaining divisional precision on the basis of said exponent part;

performing division on a dividend obtained by subtracting bit data expressing a digit higher than a prescribed digit of said fixed-point; part of said floating-point data from said fixed-point part and a divisor of said bit data and obtaining a result of division of a number of digits set on the basis of said divisional precision;

obtaining a third value serving as a logarithmic value of a value obtained by dividing said fixed-point part of said floating-point data by said bit data with said result of division; and adding said first to third values to each other.

13. The logarithmic operation method according to claim 12, wherein said step of obtaining said divisional precision includes a step of obtaining said divisional precision on the basis of said bit data.

14. The logarithmic operation method according to claim 13, wherein said step of obtaining said divisional precision includes a step of obtaining said divisional precision on the basis of said bit data when the value indicated by said exponent part is a prescribed value.

15. The logarithmic operation method according to claim 12, further including steps of:

determining whether or not the value indicated by said exponent part is equal to a prescribed value, and setting said first value to zero when determining that the value indicated by said exponent part is equal to said prescribed value.

16. The logarithmic operation method according to claim 12, further including steps of:

determining whether or not said bit data is equal to a prescribed value, and setting said second value to zero when determining that said bit data is equal to said prescribed value.

17. The logarithmic operation method according to claim 12, further including steps of:

determining whether or not bit data expressing a digit lower than a prescribed digit of said fixed-point part is equal to a prescribed value, and setting said third value to zero when determining that said bit data expressing said digit lower than said prescribed digit of said fixed-point part is equal to said prescribed value.

18. The logarithmic operation method according to claim 12, further including steps of:

determining whether or not to perform division on the basis of the value of said exponent value, and setting said third value to zero when determining not to perform division.

* * * * *